(12) United States Patent
Mueller et al.

(10) Patent No.: US 11,279,317 B2
(45) Date of Patent: Mar. 22, 2022

(54) GAS GENERATOR OF AN INFLATABLE AIRBAG, THE GAS GENERATOR INCLUDING A DIFFUSER FOR DIFFUSING INFLATION GASES

(71) Applicant: AUTOLIV ASP, INC., Ogden, UT (US)

(72) Inventors: Louis A. Mueller, Roy, UT (US); Nathaniel Lee Gerlach, Kaysville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 71 days.

(21) Appl. No.: 16/707,135

(22) Filed: Dec. 9, 2019

(65) Prior Publication Data

US 2021/0170984 A1 Jun. 10, 2021

(51) Int. Cl.
*B60R 21/264* (2006.01)
*B60R 21/217* (2011.01)
(Continued)

(52) U.S. Cl.
CPC ........ *B60R 21/264* (2013.01); *B60R 21/2171* (2013.01); *B60R 21/262* (2013.01); *B60R 2021/26076* (2013.01)

(58) Field of Classification Search
CPC . B60R 21/2171; B60R 21/261; B60R 21/262; B60R 21/264; B60R 2021/26076
See application file for complete search history.

(56) References Cited

U.S. PATENT DOCUMENTS 5,423,568 A * 6/1995 Zushi .................... B60R 21/217
280/728.2
5,536,041 A * 7/1996 Acker ................. B60R 21/2171
280/740
(Continued)

FOREIGN PATENT DOCUMENTS

DE 2547724 A1 * 5/1976 ............. B60R 21/26
DE 9408908 U1 * 11/1994 ........... B60R 21/261
(Continued)

OTHER PUBLICATIONS

Kretzschmar, Albrecht. "Translation of DE 102004056159 A1 Obtained Apr. 15, 2021". Jun. 1, 2006. Entire Document. (Year: 2006).*
(Continued)

*Primary Examiner* — Jonathan Ng
*Assistant Examiner* — Scott F. Underwood
(74) *Attorney, Agent, or Firm* — Harness, Dickey & Pierce, P.L.C.; Stephen T. Olson

(57) ABSTRACT

A gas generator including a diffuser for diffusing inflation gases generated by an inflator of the gas generator. The gas generator includes at least a first mounting stud. The diffuser has a cylindrical sidewall axially extending between first and second axial ends and circumferentially extending between first and second axially extending sides. A gap is defined between the first and second axially extending sides. The cylindrical sidewall includes a plurality of holes radially extend therethrough and includes a slot having a closed end and an open end. The diffuser circumferentially surrounds a portion of the cylindrical housing of the inflator with the first mounting stud disposed in the slot.

15 Claims, 4 Drawing Sheets

(51) Int. Cl.
    *B60R 21/262*     (2011.01)
    *B60R 21/26*     (2011.01)

(56) References Cited

U.S. PATENT DOCUMENTS

| | | | | |
|---|---|---|---|---|
| 8,764,050 | B2 * | 7/2014 | Baumgartner | B60R 21/261 |
| | | | | 280/728.2 |
| 2005/0194771 | A1 * | 9/2005 | Clark | B60R 21/26 |
| | | | | 280/736 |
| 2010/0181749 | A1 * | 7/2010 | Sugimoto | B60R 21/23138 |
| | | | | 280/743.2 |
| 2014/0265262 | A1 * | 9/2014 | Witt, Jr | B60R 21/262 |
| | | | | 280/728.2 |

FOREIGN PATENT DOCUMENTS

| | | | | |
|---|---|---|---|---|
| DE | 10339523 A1 * | 3/2005 | | B60R 21/26 |
| DE | 102004056159 A1 * | 6/2006 | | B60R 21/276 |
| DE | 102015205429 A1 * | 9/2016 | | B60R 21/262 |
| EP | 0685364 A1 * | 12/1995 | | B60R 21/23138 |
| EP | 0790154 A1 * | 8/1997 | | B60R 21/261 |
| WO | WO-2011070969 A1 * | 6/2011 | | B60R 21/2171 |
| WO | WO-2012150005 A1 * | 11/2012 | | B60R 21/261 |
| WO | WO-2015088161 A1 * | 6/2015 | | B60R 21/217 |
| WO | WO-2015111425 A1 * | 7/2015 | | B60R 21/262 |

OTHER PUBLICATIONS

Siegel et al. 'Translation of De 10339523 A1 Obtained Aug. 25, 2021'. Mar. 17, 2005. Entire Document. (Year: 2005).*

* cited by examiner

GAS GENERATOR OF AN INFLATABLE AIRBAG, THE GAS GENERATOR INCLUDING A DIFFUSER FOR DIFFUSING INFLATION GASES

FIELD

Inflatable safety restraint devices or airbags are commonly included on motor vehicles. In the event of a sensed accident condition, a sensor within the vehicle may measure abnormal deceleration and trigger ignition of a charge contained within one or more gas generators. Expanding gases or inflation gases from the charge are directed to the airbags and instantaneously inflate the airbags to protect passengers within the vehicle from harmful impact within the interior of the vehicle.

BACKGROUND

This section provides background information related to the present disclosure which is not necessarily prior art.

Inflatable safety restraint devices or airbags are commonly included on motor vehicles. In the event of a sensed accident condition, a sensor within the vehicle may measures abnormal deceleration and trigger ignition of a charge contained within one or more gas generators. Expanding gases or inflation gases from the charge are directed to the airbags and instantaneously inflate the airbags to protect passengers within the vehicle from harmful impact within the interior of the vehicle.

Inflation gases for airbags are associated with significant heat and velocity. This combination may result in a snap-load upon airbag deployment. The snap-load may stress the airbag fabric or seams.

For such airbag systems, it is generally known to provide a gas diffuser or deflector to protect surrounding airbag fabric and to direct inflation gases from the inflator in preferred directions with an airbag. Known gas diffusers may be in the form of a fabric bag with vent holes that is in fluid communication with the gas outlet of the inflator. The inflation gases first enter the fabric bag before passing through the vent holes into the main airbag. To a more limited extent, known airbag systems may include a deflector that surrounds a portion of the inflator to diffuse inflation gases.

While known arrangements for diffusing inflation gases from an inflator have proven to be suitable for their intended uses, a continuous need for improvement in the relevant art remains.

SUMMARY

This section provides a general summary of the disclosure, and is not a comprehensive disclosure of its full scope or all of its features.

In accordance with one particular aspect, the present teachings provide a gas generator for an inflatable airbag including an inflator and a diffuser for diffusing inflation gases generated by the inflator. The inflator includes a cylindrical housing and at least a first mounting stud extending from the cylindrical housing. The diffuser includes a cylindrical sidewall extending between first and second axial ends. The cylindrical sidewall surrounds a portion of the cylindrical housing. A plurality of holes radially extend through the cylindrical sidewall to diffuse inflation gases generated by the inflator. A slot is formed in the sidewall that receives the first mounting stud of the inflator. The slot includes a closed end and an open end.

In accordance with another aspect, the present teachings provide a gas generator including a diffuser for diffusing inflation gases generated by an inflator of the gas generator. The diffuser has a cylindrical sidewall axially extending between first and second axial ends and circumferentially extending between first and second axially extending sides. A gap is defined between the first and second axially extending sides. A plurality of holes radially extend through the cylindrical sidewall. The diffuser circumferentially surrounds a portion of the cylindrical housing of the inflator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
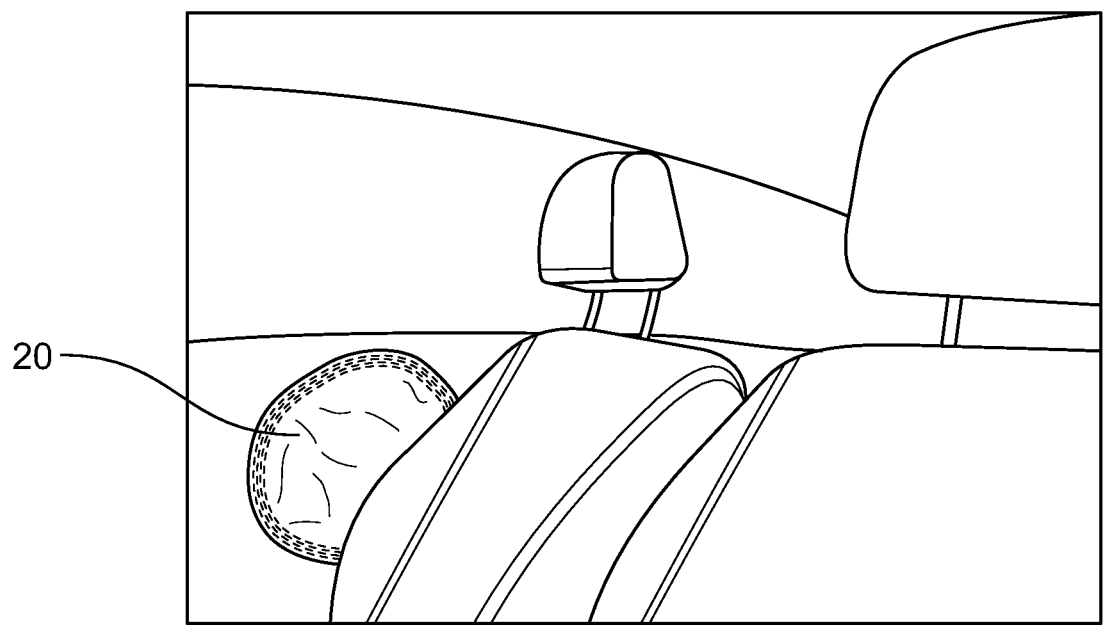
FIG. 1 is a simplified view of a gas generator in accordance with present teachings, the gas generator shown operatively associated with an exemplary airbag and incorporated into an exemplary motor vehicle.
Figure 2:
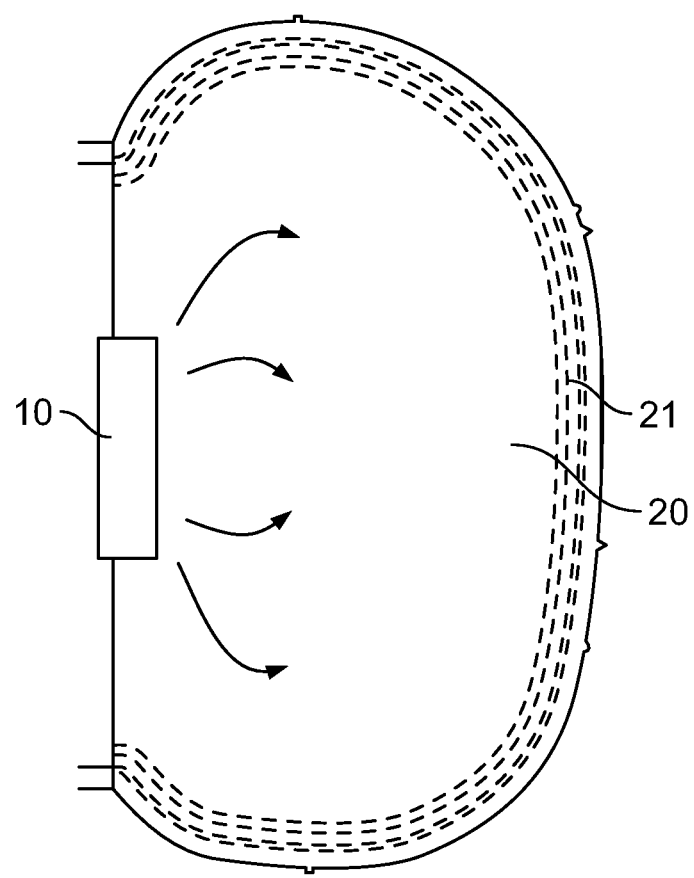
FIG. 2 is a simplified side view of the airbag assembly of FIG. 1, an inflatable airbag of the airbag assembly shown unrolled and prior to inflation and schematically illustrated to generally identify the flow of inflation gases from the inflator.
Figure 3:
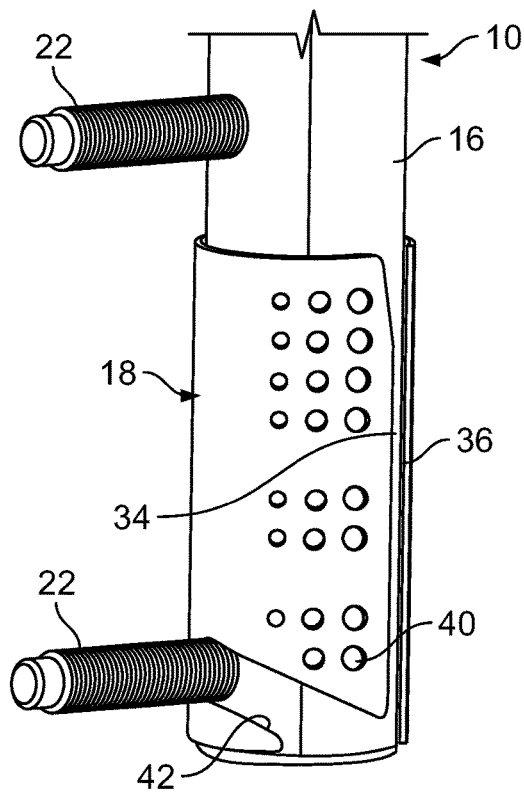
FIG. 3 is a perspective view of the gas generator of FIG. 1, the gas generator shown to generally include an inflator and a diffuser for diffusing inflation gas generated by the inflator.
Figure 3A:
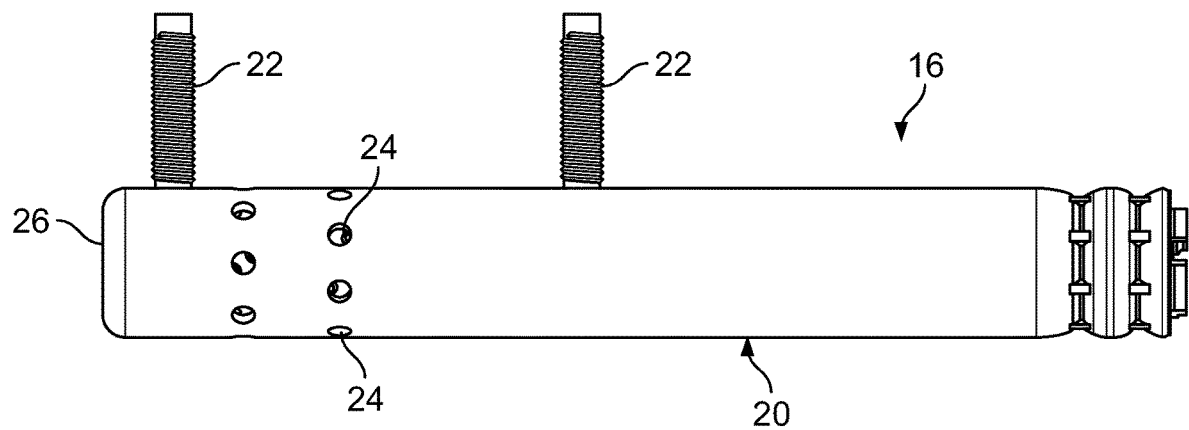
FIG. 3A is a side view of the inflator of FIG. 3.
Figure 4:
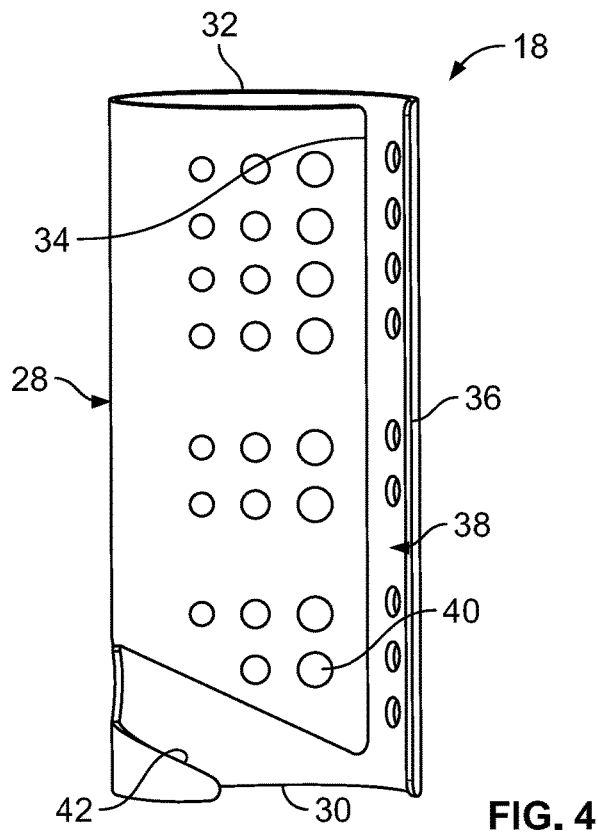
FIG. 4 is a side view of the diffuser of the present teachings.
Figure 5A:
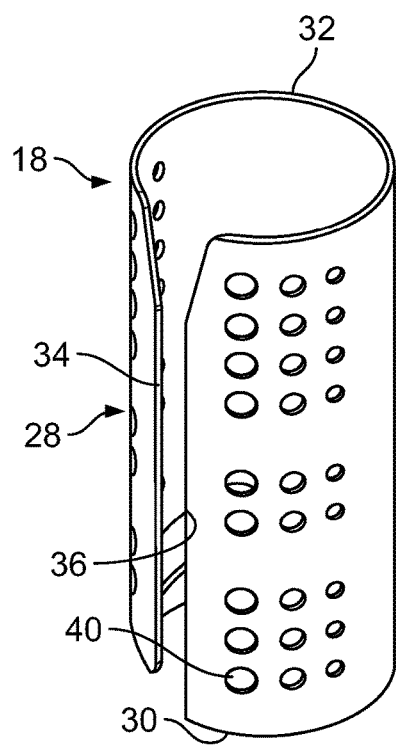
FIGS. 5A and 5B are perspective views of the diffuser of the present teachings.
Figure 5B:
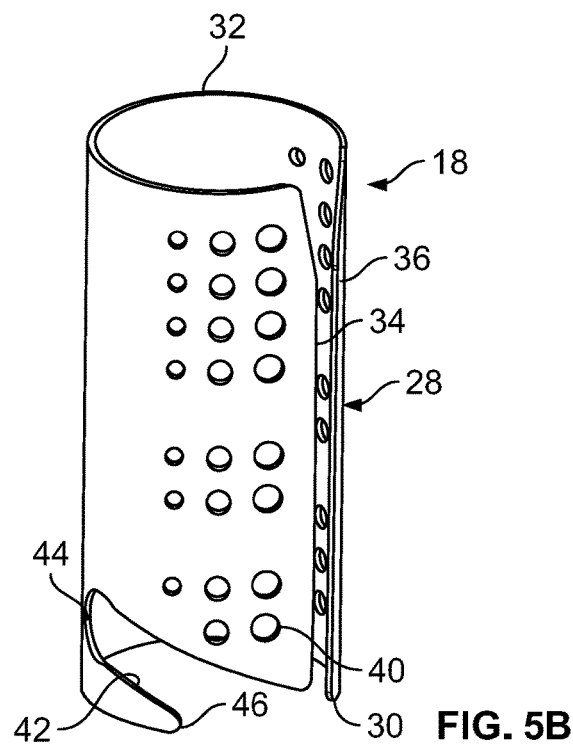

Example embodiments will now be described more fully with reference to the accompanying drawings.

Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature. "Exemplary" as used herein means serving as a typical or representative example or instance, and does not necessarily mean special or preferred.

With general reference to FIGS. 1 through 5A and 5B of the drawings, a gas generator in accordance with the present teachings is illustrated and generally identified at reference character 10. The gas generator 10 is part of an inflatable restraint system 12 of a motor vehicle 14 and generally includes an inflator 16 and a diffuser 18. In the particular application of FIGS. 1 and 2, the gas generator 10 is shown operatively associated with a side airbag system 12 having an inflatable airbag 20 deployable from or otherwise adjacent to a side of a vehicle seat. In a known manner, the inflatable airbag may include first and second panels joined at a peripheral seam and defining an inflatable chamber. The gas generator 10 is in direct fluid communication with the inflatable chamber of the airbag 20 (e.g., at least partially disposed within the airbag) and adapted to inflate the airbag 20. The particular airbag 20 shown in the drawings will be understood to be merely exemplary. In this regard, certain aspects of the present teachings may be used in connection with other airbag systems. Inflator and diffusers as shown and described may be used with any airbag located inside or outside of a vehicle, or may be used in other applications where such an inflator and diffuser may be useful.

The inflator 16 shown in the drawings will be understood to be conventional in construction and operation insofar as the scope of present teachings are concerned. The inflator 16 may include a generally cylindrical housing 20 and at least a first mounting stud 22. The housing 20 is elongated along an axis A and defines a plurality of gas outlets 24. In the embodiment illustrated, the gas outlets 24 may be located between first and second mounting studs 22 and may be generally configured to radially direct inflation gases. As shown, the gas outlets 24 circumferentially extend about the housing 20 and are located proximate a distal end 26 of the housing 20.

The diffusor 18 includes a cylindrical sidewall 28 extending between first and second axial ends 30 and 32, respectively. As shown perhaps most particularly in FIG. 3, the cylindrical sidewall 28 is configured to at least substantially surround a portion of the cylindrical housing 28 in a circumferential direction. Preferably, the cylindrical sidewall 28 extends through at least 180 degrees and thereby surrounds the cylindrical housing 28 through at least 180 degrees in the circumferential direction. More preferably, the cylindrical sidewall 28 surrounds the cylindrical housing 28 through at least about 345 degrees, but less than 360 degrees in the circumferential direction. As such, the cylindrical sidewall 28 includes first and second axially ending sides 34 and 36, respectively, separated by a gap 38.

The sidewall 28 is formed to include a plurality of holes 40. The holes 40 radially extend through the cylindrical sidewall 28 and are configured to diffuse inflation gases generated by the inflator 16. Inflation gases may also be diffused by the gap 38 between the first and second axially extending sides 34 and 36. In the embodiment illustrated, the holes 34 are arranged in axially extending rows and may decrease in size as a distance from the gap 38 increases. In one particular, application a first axially extending row of holes 40 on both sides of the gap 38 has a hole size of approximately 2.50 mm, a second axially extending row of holes 40 on both sides of the gap 38 has a hole size of approximately 2.00 mm, and a third axially extending row of holes 40 on both sides of the gap 38 has a hole size of approximately 1.50 mm. Insofar as the scope of the present teachings are concerned, the pattern of the holes 40 and the sizes of the holes 40 may be varied for specific applications.

The sidewall 28 is further formed to include a slot 42. The slot includes a closed end 44 and an open end 46 and receives the first mounting stud 22 of the inflator 16. The slot 42 circumferentially extends partially around the cylindrical sidewall 28. As shown, the slot 42 may circumferentially extend partially around the cylindrical sidewall 28 at an angle to a radially extending plane. Preferably, the slot 42 circumferentially extends partially around the cylindrical sidewall 28 at an angle of at least 10 degrees to a radially extending plane.

In certain applications, the open end 46 of the slot 42 is open to one of first and second axial ends 30 and 32 of the cylindrical sidewall 28. In other applications, the open end 46 of the slot 42 extends to the gap 38 between the axially extending sides 34 and 36 of the sidewall 28. As particularly shown in the drawings, the open end 46 of the slot 42 may open the first axial end 30 of the cylindrical sidewall 28 and may also extend to the gap 38 between the axially extending sides 34 and 36 of the sidewall 28. The closed end 44 of the slot 42 includes a circular opening 48 that receives the first mounting stud 22 of the inflator 16. The slot 42 further includes a reduced width portion 50 disposed adjacent the circular opening 48. The reduced width portion 50 retains the first mounting stud 22 within the circular opening 48.

Figure 6:
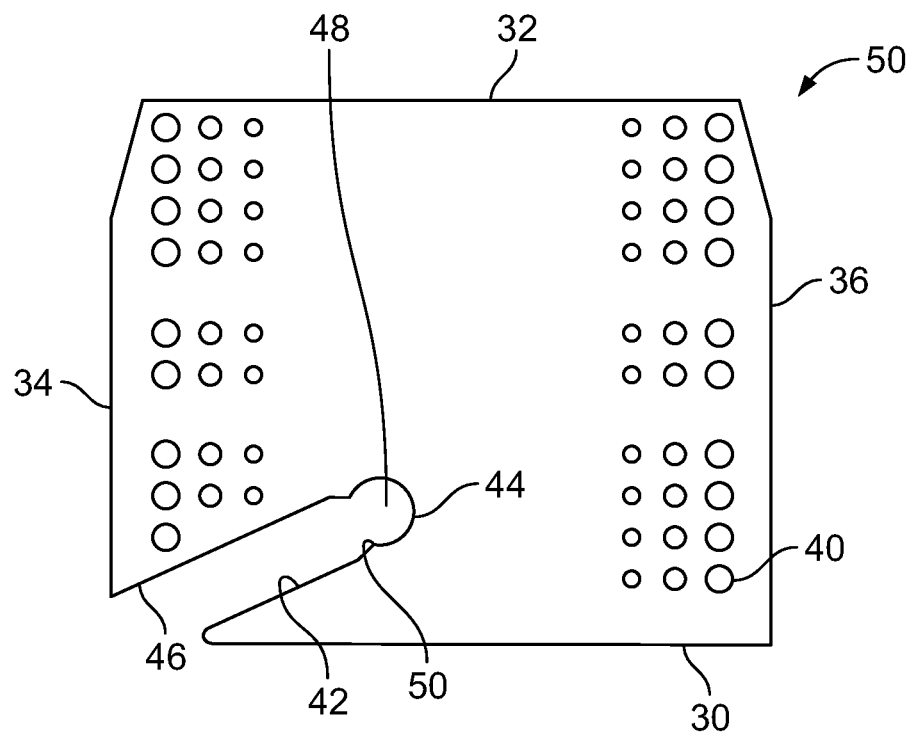
FIG. 6 is a stamping for the diffuser of the present teachings, the stamping shown in a planar condition prior to rolling.

With reference to FIG. 6, a stamping 50 for the diffuser 18 of the present teachings is illustrated. Explaining further, the diffuser 18 may be stamped from a sheet of metal. The stamping 50 may be subsequently rolled to cylindrically shape the sidewall 28. Similarly, the diffuser 18 may be machined or otherwise manufactured from tubing, or may be otherwise formed from metal into the cylindrical shape using any suitable production process.

The diffusor 18 is installed on the inflator 16 by first passing the first mounting stud 18 down the gap 38 between the first and second axially extending sides 34 and 36. The first mounting stud 18 is introduced into the gap 38 at the second axial end 32 of the cylindrical sidewall 28. The diffuser 18 is axially advanced until the first mounting stud 22 is at the first axial end 30 of the cylindrical sidewall 28. Next, the diffusor 18 is rotated about the axis A so that the first mounting stud 22 advances along the slot 42 from the open end 46 to the closed end 50. The first mounting stud 22 passes the reduced width area 50 and is thereby retained within the slot 42 for shipment and subsequent installation within a vehicle.

Figure 7:
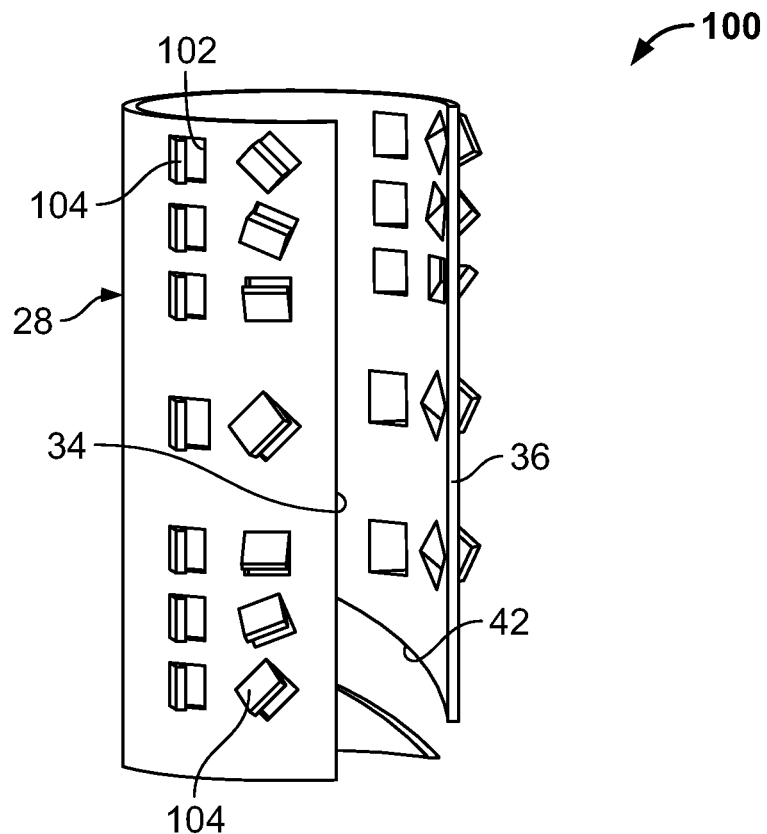
FIG. 7 is a side view of another diffuser of the present teachings.

Turning to FIG. 7, another diffuser in accordance with the present teachings is shown and generally identified at reference character 100. The diffuser 100 primarily differs from the diffuser 18 by incorporating a plurality of holes 102 having a different hole shape and a different hole pattern. In view of the similarities between the diffuser 100 and the diffuser 18, like reference characters will be used to identify similar elements.

As with the diffusor 18, the holes 102 of the diffusor 100 radially extend through the cylindrical sidewall 28, are configured to diffuse inflation gases generated by the inflator 16 and may be are arranged in axially extending rows. Each of the holes 102 may be generally rectangular in shape and may each be associated with a chad 104. The chads 104 are defined by the material displaced from the cylindrical sidewall 28 to form the holes 102. Each chad 104 may include a first side connected to the cylindrical sidewall 28. In the embodiment illustrated, the holes 102 may be generally rectangular and may be may be generally uniform in size and shape.

In certain applications, the sides of the holes 102 may be orthogonal to the axis A. In other applications, the sides of the holes 102 may be askew to the axis A. As particularly shown in the drawings, the sides of some of the holes 102 may be orthogonal to the axis A and the sides of other of the holes may be askew to the axis A.

The chads 104 associated with the holes are oriented at an angle relative to the cylindrical sidewall 28. Preferably, at least some of the chads 104 are oriented at an angle relative to the cylindrical sidewall 28 that is less than 180 degrees such that these chads 104 radially impede and thereby deflect inflation gases passing through the respective holes 102. The windows cooperatively defined by the holes 102 and associated chads 104 may be tuned to restrict and direct the flow of inflation gases as required for particular applications.

As with the diffusor 18, the diffusor 100 may be stamped from a sheet of metal and subsequently rolled to cylindrically shape the sidewall 28, or may be machined or manufactured from metal tubing, or formed using any suitable manufacturing process.

Accordingly, it will now be appreciated that the present teachings provide various embodiments of an inflation gas diffusor that may be used to prevent snap-loading of an inflatable airbag. By reducing such loading, it may be possible to incorporate less expensive airbag fabrics and/or improve airbag integrity. The holes of the diffusors and the gap between axially extending sides of diffusors may function to substantially eliminate direct flow paths from the gas outlets of the inflator 16 to the airbag fabric, the airbag seams 21 or both.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A gas generator for an inflatable airbag, the gas generator comprising:
    an inflator including a cylindrical housing and at least a first mounting stud extending from the cylindrical housing; and
    a diffuser for diffusing inflation gases generated by the inflator, the diffuser including:
        a cylindrical sidewall extending between first and second axial ends, the cylindrical sidewall surrounding a portion of the cylindrical housing;
        a plurality of holes radially extending through the cylindrical sidewall to diffuse inflation gases generated by the inflator; and
        a slot receiving the first mounting stud of the inflator, the slot including a closed end and an open end,
    wherein the cylindrical sidewall includes first and second axially extending sides separated by a gap, and
    wherein the slot includes an open end extending to the gap and extending to one of the first and second axial ends of the cylindrical sidewall.

2. The gas generator for an inflatable airbag of claim 1, wherein the slot circumferentially extends partially around the cylindrical sidewall.

3. The gas generator for an inflatable airbag of claim 2, wherein the slot circumferentially extends partially around the cylindrical sidewall at an angle to a radially extending plane.

4. The gas generator for an inflatable airbag of claim 1, wherein each hole of the plurality of holes is associated with a chad having a first side connecting to the cylindrical sidewall.

5. The gas generator for an inflatable airbag of claim 4, wherein each chad is oriented at an angle relative to the cylindrical sidewall such that each chad radially impedes and thereby deflects inflation gases passing through a respective hole of the plurality of holes.

6. A gas generator for an inflatable airbag, the gas generator comprising:
    an inflator including a cylindrical housing and at least a first mounting stud extending from the cylindrical housing; and
    a diffuser for diffusing inflation gases generated by the inflator, the diffuser including:
        a cylindrical sidewall extending between first and second axial ends, the cylindrical sidewall surrounding a portion of the cylindrical housing;
        a plurality of holes radially extending through the cylindrical sidewall to diffuse inflation gases generated by the inflator; and
        a slot receiving the first mounting stud of the inflator, the slot including a closed end and an open end,
    wherein the closed end of the slot includes a circular opening receiving the first mounting stud of the inflator and a reduced width portion of the slot is disposed adjacent the circular opening for retaining the first mounting stud within the circular opening.

7. A gas generator for an inflatable airbag, the gas generator comprising:
    an inflator including a cylindrical housing and at least a first mounting stud extending from the cylindrical housing; and
    a diffuser for diffusing inflation gases generated by the inflator, the diffuser including:
        a cylindrical sidewall having first and second axial ends and first and second axially extending sides;
        a plurality of holes radially extending through the cylindrical sidewall to diffuse inflation gases generated by the inflator;
    a gap between the first and second axially extending sides; and
    a slot for receiving the first mounting stud of the inflator, the slot open to the gap at one of the first and second axial ends of the sidewall of the diffuser,
    wherein the gap axially extends completely from the first axial end to the second axial end.

8. The gas generator for an inflatable airbag of claim 7, further comprising a circular opening extending through the cylindrical sidewall, the circular opening for receiving the mounting stud of the inflator, the circular opening having a closed circumference that extends through at least 180 degrees.

9. The gas generator for an inflatable airbag of claim 8, further comprising a slot for receiving the mounting stud, the slot including an open end and a closed end, the circular opening defined at the closed end.

10. The gas generator for an inflatable airbag of claim 9, wherein the open end of the slot is open to one of first and second ends of the cylindrical sidewall.

11. The gas generator for an inflatable airbag of claim 9, wherein the open end of the slot extends to the gap.

12. The gas generator for an inflatable airbag of claim 7, wherein each hole of the plurality of holes is associated with a chad having a first side connecting to the cylindrical sidewall, each chad oriented at an angle relative to the cylindrical sidewall such that each chad radially impedes and thereby deflects inflation gases passes through a respective hole of the plurality of holes.

13. A gas generator for an inflatable airbag, the gas generator comprising:
   an inflator including a cylindrical housing and at least a first mounting stud extending from the cylindrical housing; and
   a diffuser for diffusing inflation gases generated by the inflator, the diffuser including:
      a cylindrical sidewall having first and second axial ends and first and second axially extending sides;
      a plurality of holes radially extending through the cylindrical sidewall to diffuse inflation gases generated by the inflator;
      a gap between the first and second axially extending sides; and
      a slot for receiving the mounting stud, the slot including an open end and a closed end, wherein the slot circumferentially extends partially around the cylindrical sidewall at an angle to a radially extending plane, the angle to the radially extending plane being at least 10 degrees.

14. A gas generator for an inflatable airbag, the gas generator comprising:
   an inflator including a cylindrical housing and at least a first mounting stud extending from the cylindrical housing; and
   a diffuser for diffusing inflation gases generated by the inflator, the diffuser including:
      a cylindrical sidewall having first and second axial ends and first and second axially extending sides;
      a plurality of holes radially extending through the cylindrical sidewall to diffuse inflation gases generated by the inflator;
      a gap between the first and second axially extending sides; and
      a slot for receiving the mounting stud, the slot including an open end and a closed end,
   wherein the open end of the slot extends to both the gap and one of the first and second axial ends of the cylindrical sidewall.

15. A gas generator for an inflatable airbag, the gas generator comprising:
   an inflator including a cylindrical housing and at least a first mounting stud extending from the cylindrical housing; and
   a diffuser for diffusing inflation gases generated by the inflator, the diffuser including:
      a cylindrical sidewall having first and second axial ends and first and second axially extending sides;
      a plurality of holes radially extending through the cylindrical sidewall to diffuse inflation gases generated by the inflator;
      a gap between the first and second axially extending sides; and
      a slot for receiving the mounting stud, the slot including an open end and a closed end; and
      a circular opening defined at the closed end of the slot, the circular opening for receiving the mounting stud of the inflator, a reduced width portion of the slot disposed adjacent the circular opening for retaining the stud within the circular opening.

* * * * *